ANALOGUE-TO-DIGITAL CONVERTER EMPLOYING SERIES CONNECTED NEGATIVE RESISTANCE DEVICES

Filed Oct. 8, 1965

3 Sheets-Sheet 1

Inventors
JOHN C. PRICE
RYSZARD KITAJEWSKI
By Percy P. Lantzy
Attorney

Inventors
JOHN C. PRICE
RYSZARD KITAJEWSKI
By [signature]
Attorney

Inventors
JOHN C. PRICE
RYSZARD KITAJEWSKI
By [signature]
Attorney 3,460,128

ANALOGUE-TO-DIGITAL CONVERTER EMPLOYING SERIES CONNECTED NEGATIVE RESISTANCE DEVICES

John Clifford Price and Ryszard Kitajewski, Aldwych, London, England, assignors to International Standard Electric Corporation, New York, N.Y., a corporation of Delaware Filed Oct. 8, 1965, Ser. No. 494,009
Claims priority, application Great Britain, Feb. 12, 1965, 6,168/65
Int. Cl. H03k *13/02*
U.S. Cl. 340—347 14 Claims

ABSTRACT OF THE DISCLOSURE

An equilibrium type encoder having a plurality of bistable coding elements connected in series with each other and the source of analogue signal having superimposed thereon a damp oscillatory waveform of fixed initial amplitude and a predetermined rate of decay. Each bistable element includes a pair of transistors in a common emitter switching configuration to connect a constant current source to an output resistor connected to the collector of one of the pair of transistors. The bistable element containing the components defined above each exhibit a negative resistance characteristic similar to a tunnel diode. In the case of a binary converter, each constant current source is twice the value of the preceding one.

This invention relates to analogue-to-digital converters and is applicable to encoders used in P.C.M. (pulse code modulation) systems.

The basis of many analogue-to-digital converters is one or more bistable elements which produce the digital output. Example of such bistable elements are tunnel diodes, magnetic cores with a "square" hysteresis loop and multivibrator circuits.

The copending application of A. H. Reeves, Ser. No. 366,778, filed May 12, 1964, now U.S. Patent No. 3,320,605 describes an analogue-to-digital converter operating according to the equilibrium principle in which a number of interconnected bistable elements each having a different switching characteristics have applied to them an analogue quantity together with a damped oscillatory waveform. Depending on the amplitude of the analogue quantity certain of the bistable elements will be switched alternately from one condition to the other in succeeding cycles of the oscillatory waveform until the system comes to rest in a state of equilibrium, and the final condition of each bistable element represents the corresponding digit value.

According to the present invention there is provided an analogue-to-digital converter including a plurality of interconnected bistable digital elements, means for applying an amplitude sample of the analogue quantity to be converted to the interconnected elements, each element including a two-terminal network, a constant current source and switching means arranged to connect the current source to the network in response to a predetermined voltage across the network so that the current/voltage characteristic of the element is a negative resistance characteristics.

In a preferred embodiment, the digital elements are interconnected in series with one another and the switching characteristics of the elements are all different, each element being arranged to switch over at twice the voltage across the network of that of the succeeding element in the series.

Conveniently each digital element comprises a resistor connected in series with the collector of one of a pair of transistors connected together in a common emitter configuration.

Figure 1:
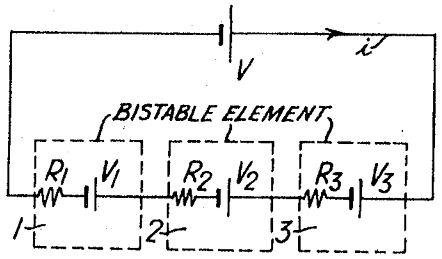
Figure 2:
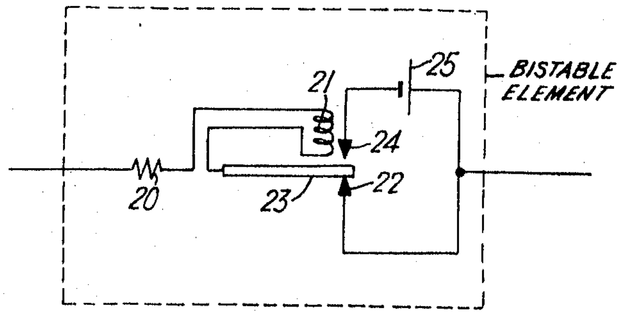
Figure 3:
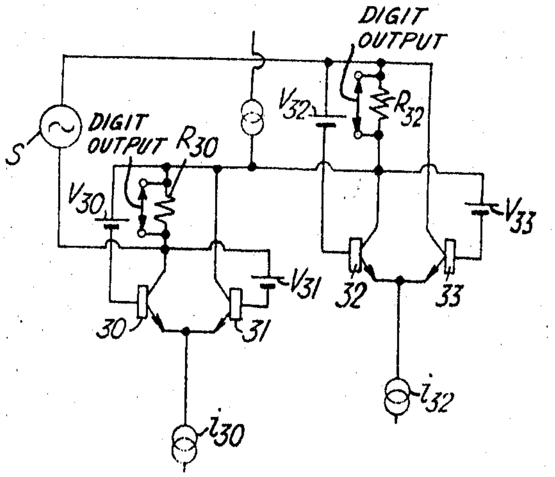
Figure 4:
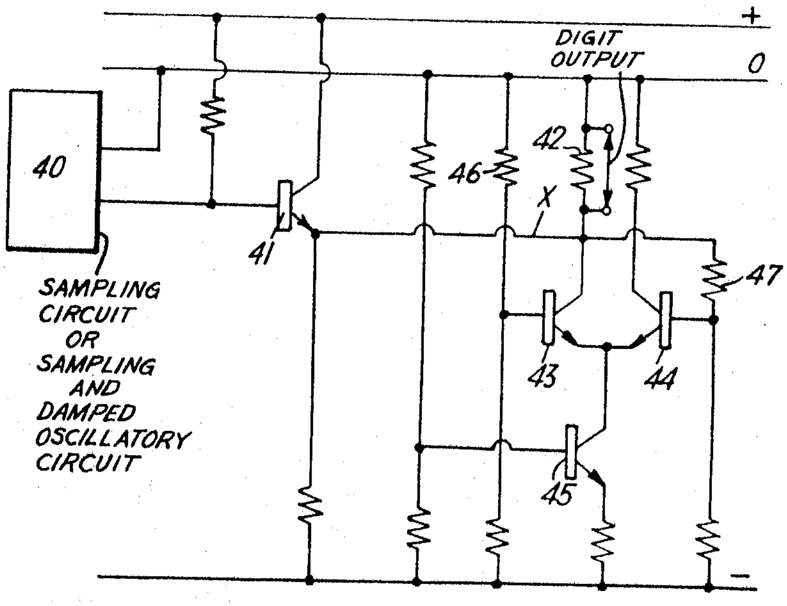
Figure 5:
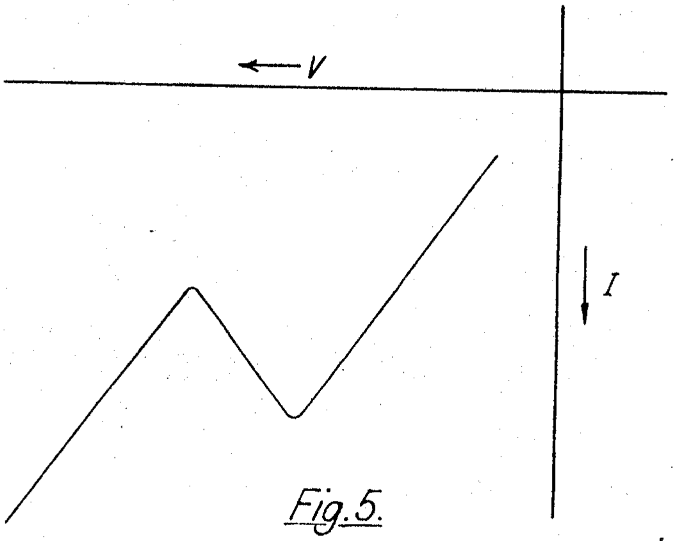
Figure 6:
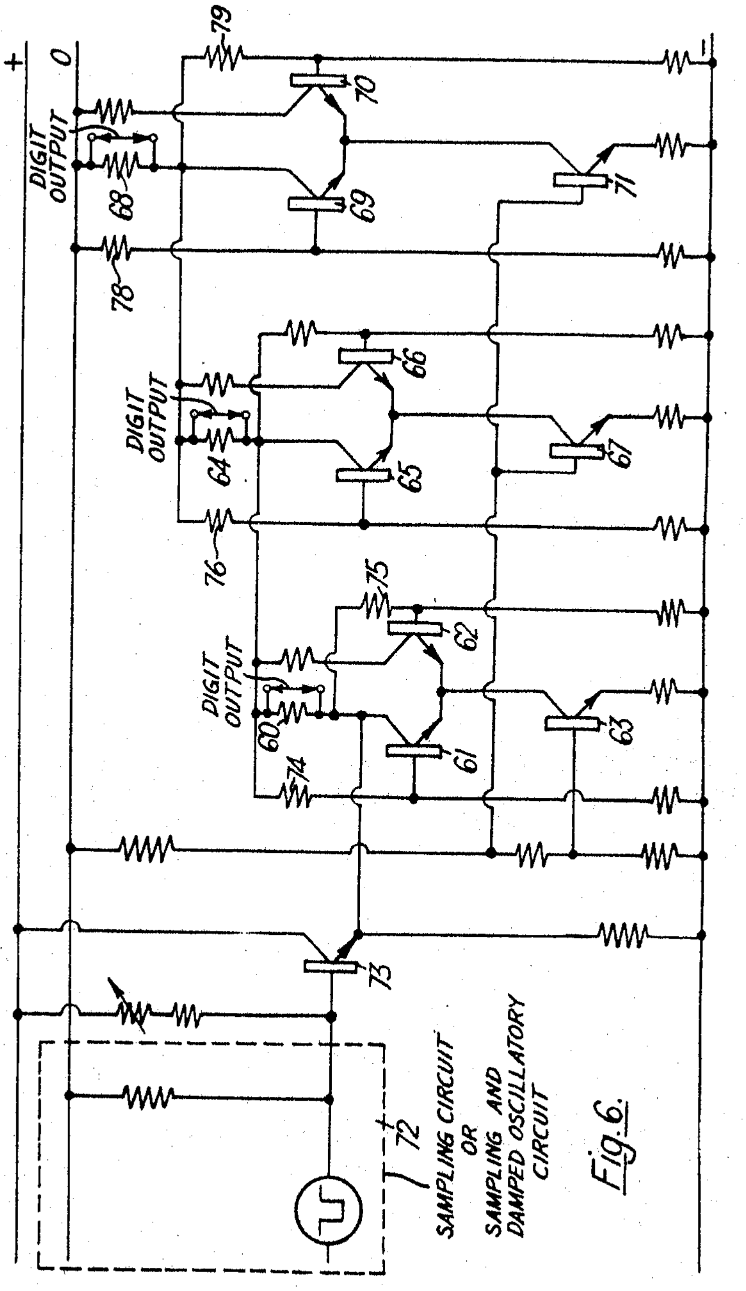

The above and other features of the invention will become more apparent in the following description of a P.C.M. encoder with reference to the accompanying drawings, in which:

FIG. 1 illustrates a simple model of a P.C.M. encoder employing the equilibrium principle of the above cited copending application of A. H. Reeves, FIG. 2 illustrates the action of a bistable digital element in terms of a relay, FIG. 3 illustrates the basic circuit of a two digit coder analogous to the tunnel diode coder of the above cited copending application of A. H. Reeves, FIG. 4 is an experimental circuit for a single bistable digital element, FIG. 5 shows the current/voltage characteristic of the circuit of FIG. 4, and FIG. 6 is an experimental circuit for a three digit binary coder.

The simple model depicited in FIG. 1 is of a three digit binary coder. Each digit is coded by a bistable element 1, 2 an 3, and these are represented by resistances $R_1$, $R_2$, and $R_3$ and voltage sources $V_1$, $V_2$, $V_3$, respectively. The bistable elements are connected in series with one another and with a voltage source V. As V is initially zero, so $V_1$, $V_2$ and $V_3$ are also zero. A switching means (not shown) is incorporated in each bistable and is arranged to disconnect $V_1$, $V_2$ and $V_3$ from the circuit until a predetermined voltage across the corresponding resistances $R_1$, $R_2$ and $R_3$ is reached. As V increases, current $i$ increases through $R_1$ and a point is reached when $V_1$ is now included in the circuit. $V_1$ opposes V in polarity, so the circuit current is reduced. This point at which $V_1$ is included in the circuit is reached when V reaches one quantum level is reached, $V_2$ is introduced into the loop. The change in the circuit current $i$ is sufficient to cut-off voltage $V_1$. If now V is increased still further $i$ increases again and $V_1$ will be restored to the loop with $V_2$ at the third quantum level, and similarly at the fourth quantum level $V_3$ will be introduced and $V_1$ and $V_2$ cut-off.

The action of the bistable element can be likened to the relay arrangement shown in FIG. 2 in which the resistance 20 is in series with the solenoid 21 and the contact 22 via the relay armature 23. As the current through 20 is increased to one quantum level, the armature is pulled up and switches the circuit from contact 22 to contact 24. This introduces the voltage source 25 into the circuit. When the current is reduced, as for instance when a similar bistable element responsive to a quantum jump of two is switched on, the armature 23 is released and restores the circuit via contact 22.

In a tunnel diode coder described in the above-cited copending application of A. H. Reeves each bistable element includes one or more tunnel diodes referred to the secondary windings of a corresponding transformer, the primary windings of which are in series. The quantum levels are easily defined by the primary/secondary ratios of the respective transformer windings.

In the present invention the bistable element comprises a pair of transistors 30, 31 and 32, 33 connected together in a common emitter current switching configuration as shown in FIG. 3 with a resistance $R_{30}$, $R_{32}$ connected in series with one another and each resistor being in series with one of the transistors 30 and 32, respectively. Each element is connected to a separate constant current source $i_{30}$ and $i_{32}$, respectively. The amplitude sample of the analogue quantity to be coded is provided by the source S. The two bistable elements of FIG. 3 are cascaded, and the value of $i_{32}$ is twice that of $i_{30}$. The switching of the current sources $i_{30}$ and $i_{32}$ by the transistors is controlled by the voltage sources $V_{30}$, $V_{31}$ and $V_{32}$, $V_{33}$, respectively.

In the initial state, when there is no signal applied, transistors 31 and 33 are conducting. As the voltage from S is increased to the first quantum level transistor 31 is switched off and transistor 30 is switched on. If the action of the circuit is compared with that of FIG. 1, the voltage corresponding to $V_1$ in the simple model is obtained by switching the constant current source $i_{30}$ to the resistance $R_{30}$. If the signal level rises further to the second quantum level transistor 33 switches off and thereby causes transistor 30 to switch off and transistors 31 and 32 to switch on.

The operation of the circuit of FIG. 3 may be more fully described as follows. The base voltage $V_{30}$ of transistor 30 and the base voltage $V_{31}$ of transistor 31 are appropriately adjusted to provide the initial state for transistors 30 and 31, that is, transistor 30 non-conductive and transistor 31 conductive. The base voltage $V_{32}$ of transistor 32 and the base voltage $V_{33}$ of transistor 33 are appropriately adjusted to provide the initial state for transistors 32 and 33, that is, transistor 32 non-conductive and transistor 33 conductive. In addition, the relative value of base voltages $V_{30}$, $V_{31}$ and $V_{32}$, $V_{33}$ of each pair of transistors 30, 31, and 32, 33 is adjusted so that transistors 30 and 31 switch their conduction state at the first quantum level and transistors 32 and 33 switch their conduction states at the second quantum level.

When the signal S increases to the first quantum level, the collector voltage of transistor 30 increases and becomes more positive than the base voltage $V_{30}$ causing transistor 30 to conduct. Conduction of transistor 30 develops a voltage across-resistor $R_{30}$ which represents the binary "1" output of this bistable or code element. Resistor $R_{30}$ is the two-terminal network, or output network of the bistable element. Voltage developed across resistor $R_{30}$ acts to reduce the base voltage of transistor 31 relative to its collector voltage and thereby render transistor 31 non-conductive.

Transistors 30 and 31 will stay in this state until the signal S increases to the second quantum level which will cause the collector voltage of transistor 32 to become more positive than the base voltage $V_{32}$ and render transistor 32 conductive thereby developing a voltage across resistor $R_{32}$ proportional to the weighted current from source $i_{32}$ (a "1" output at the two-terminal network for this bistable element). The voltage developed across resistor $R_{32}$ makes the base voltage of transistor 33 more negative than its collector voltage and results in rendering transistor 33 non-conductive. The conduction of transistor 32 changes the total current in the series circuit so as to change the potential at the collector of transistor 30 so that base voltages $V_{30}$, $V_{31}$ again biases transistor 30 to be non-conductive and transistor 31 to be conductive.

The practical circuit shown in FIG. 4 comprises the first coding element only of a series and receives an amplitude sample from the sampling circuit 40 via the transistor 41. The two terminal network is provided by the resistor 42 which provides the binary condition or digit output of the coding element. The current switching is performed by the transistors 43 and 44. Transistor 45 provides a constant current source for the bistable element. This circuit exhibits at point X the current/voltage characteristic shown in FIG. 5, and it will be noted that this curve is similar to a tunnel diode characteristic.

The operation of the circuit of FIG. 4 may be more fully described as follows. Resistor 46 (equivalent to $V_{30}$, FIG. 3,) cooperates with resistor 47 (equivalent to $V_{31}$, FIG. 3) to establish the initial state, that is, transistor 43 non-conductive and transistor 44 conductive. When the analog signal from transistor 41 increases to the first quantum level, with resistors 46 and 47 selected to enable switching the conduction conditions of transistors at this level, the collector of transistor 43 is more positive than the base electrode and transistor 43 conducts causing current to flow through resistor 42. The voltage drop in resistor 42 proportional to the current from transistor 45 causes a decrease in voltage at the base of transistor 44 which is sufficient to switch transistor 44 to its non-conductive state.

There bistable elements of the type shown in FIG. 4 can be connected in series to form a three digit binary coder, as shown in FIG. 6. The bistable elements comprise resistors 60, 64 and 68, the two-terminal digit output networks, with the associated pair of current switching transistors 61, 62; 65, 66; and 69, 70. The bistable elements also have their own constant current source provided by the transistors 63, 67 and 71. The sampling circuit 72 is coupled to the coder by the transistor 73. Each stage is designed so that for a zero input signal the right hand transistor in each element is on and the left hand transistor off.

Weighting currents are 5 ma., 10 ma. and 20 ma. with equal resistance of 100 ohms for each of the resistors 60, 64, and 68. The resistors 74, 75 in the first element provide the voltages which define the switching threshold of that element, as do the corresponding resistors 76, 77 in the second element and resistors 78, 79 in the third element. Setting up the circuit consists essentially of adjusting the relative base voltages of each pair of transistors so that the element switches over as required at each quantum level. For stages after the first the output of the stage is adjusted so that the next stage switching on its left hand transistor drives off the left hand transistor of the previous stage. This adjustment can be made either by modifying the bistable element impedance or by modifying the constant current value.

The operation of FIG. 6 may be more fully described as follows. Resistors 74 and 75 have their values related to render transistor 61 non-conductive and transistor 62 conductive and establishes for these transistors a switching threshold equal to the first quantum level. Resistors 76 and 77 have their values selected to render transistor 65 non-conductive and transistor 66 conductive and establishes for these transistors a switching threshold equal to the second quantum level. Resistors 78 and 79 have have their values selected to render transistor 69 non-conductive and transistor 70 conductive and establishes for these transistors a switching threshold equal to the fourth quantum level. When the analog signal from transistor 73 increases to the first quantum level, the collector of transistor 61 is made more positive than the base thereof thereby rendering transistor 61 conductive. The voltage developed across resistor 60 will render the base of transistor 62 more negative than the collector thereof rendering transistor 62 non-conductive. A further increase of analog signal from transistor 73 to the second quantum level will cause the collector of transistor 65 to become more positive than its base and, thus, transistor 65 is rendered conductive. The voltage developed across resistor 64, proportional to the weighted current from transistor 65, will result in the base of transistor 66 becoming more negative than its collector and, thus, transistor 66 will become non-conductive. With the conduction of transistor 65, the total circuit current will be such that the voltage at the collector of transistor 61 will become less positive than its base resulting in non-conduction of transistor 61. Without the voltage drop across resistor 60, the base of transistor 62 will be returned to its initial condition and transistor 62 will become conductive.

An increase of analog voltage to the third quantum level will again cause the collector to transistor 61 to become more positive than its base rendering transistor 61 conductive. Conduction of transistor 61 causes a voltage drop across resistor 60, proportional to the weighted current from transistor 63, which reduces the base with respect to the collector of transistor 62 thereby rendering transistor 62 non-conductive. Under these conditions, there will be weighted constant current through the two-terminal output networks composed of resistors 60 and 64 as supplied by transistor 63 and 67, respectively.

Now as the analog input signal increases to the fourth quantum level, the collector of transistor 69 becomes more positive than its base and, thus, is renderd conductive. The resultant voltage drop across resistor 68 makes the voltage on the base of transistor 70 less than its collector voltage and, thereby, renders transistor 70 non-conductive. The weighted current from transistor 71 through resistor 68 alters the total circuit current so that the collector potential of transistors 61 and 65 is reduced thereby resulting in non-conduction of transistors 61 and 65, and, hence, conduction of transistors 62 and 66.

As the analog signal increases to the next quantum level, the coding element including transistors 61 and 62 will be switched to its "1" condition (weighted current through resistor 60). If the analog signal increases to the next quantum level, the coding element including transistors 65 and 66 will be switched to its "1" condition (weighted current through resistor 64) and the coding element including transistors 61 and 62 will be switched to its "0" condition no (weighted current through 60). If the analog signal further increases to the next and last quantum level, the coding element including transistors 61 and 62 will be switched to its "1" condition and all three elements will be in the "1" condition.

In all the above examples the operation is described in terms of an amplitude sample alone being applied to the circuit. The question of whether or not a bistable element is "on" depends on a voltage (or current) threshold. If, in addition to this threshold a timing control is introduced the circuit is no longer solely dependent on voltage (or current) and there is greater freedom in the choice of the threshold. This enables improved tolerances and linearity to be achieved. The practical form of time control which can be used in all the above circuits is the damped oscillatory waveform disclosed in the above-cited copending application of A. H. Reeves. Thus, for instance, circuit 40 of FIG. 4 and circuit 72 of FIG. 6 may be modified to include a sampling circuit whose output triggers a damped oscillatory circuit to provide an input to the coder that is a combination of a step function of the analogue input and a superposed damped oscillatory waveform having a fixed initial amplitude and a predetermined rate of decay.

It is to be understood that the foregoing description of specific examples of this invention is not to be considered as a limitation of its scope.

What we claim is:

1. An analogue-to-digital converter comprising:
a plurality of series connected bistable digital elements; and
a source of at least the amplitude samples of the analogue quantity to be converted coupled in series to said bistable elements;
each of said bistable elements including
a two terminal network,
a constant current source, and
switching means coupled between said network and said current source to connect said current source to said network in response to a predetermined voltage across said network so that the current-voltage characteristic of said bistable element is a negative resistance characteristic.

2. A converter according to claim 1, wherein said source includes a sampling and damped oscillatory circuit to provide said samples having superimposed thereon a damped oscillatory signal of fixed initial amplitude and a predetermined rate of decay.

3. A converter according to claim 1, wherein said constant current source includes the emitter-collector path of a first transistor coupled to said switching means.

4. A converter according to claim 3, wherein said switching means includes a pair of transistors connected in a common emitter configuration, the collector of one of said pair of transistors being coupled in series with said network and the emitter of both said pair of transistors being coupled in series with the emitter-collector path of said first transistor.

5. A converter according to claim 1, wherein said switching means includes a pair of transistors connected in a common emitter configuration, the collector of one of said pair of transistors being coupled in series with said network and the emitter of both said pair of transistors being coupled to said constant current source.

6. A converter according to claim 1, wherein each of said current sources provide twice as much current as the preceding one of said current sources in said bistable elements.

7. A converter according to claim 1, wherein said network includes a resistor.

8. A converter according to claim 1, wherein
said network includes a resistor;
said constant current source includes the emitter-collector path of a first transistor; and
said switching means includes a pair of transistors connected in a common emitter configuration, the collector of one of said pair of transistors being coupled in series with said resistor and the emitter of both said pair of transistors being coupled in series with the emitter-collector path of said first transistor.

9. A converter according to claim 2, wherein said switching means includes a pair of transistors connected in a common emitter configuration, the collector of one of said pair of transistors being coupled in series with said network and the emitter of both said pair of transistors being coupled to said constant current source.

10. A converter according to claim 2, wherein said constant current source includes the emitter-collector pair of a first transistor coupled to said switching means.

11. A converter according to claim 2, wherein
said constant current source includes the emitter-collector path of a first transistor; and
said switching means includes a pair of transistors connected in a common emitter configuration, the collector of one of said pair of transistors being coupled in series with said network and the emitter of both said pair of transistors being coupled in series with the emitter-collector path of said first transistor.

12. A converter according to claim 2, wherein each of said current sources provide twice as much current as the preceding one of said current sources in said series connected bistable elements.

13. A converter according to claim 2, wherein said network includes a resistor.

14. A converter according to claim 2, wherein
said network includes a resistor;
said constant current source includes the emitter-collector path of a first transistor; and
said switching means includes a pair of transistors connected in a common emitter configuration, the collector of one of said pair of transistors being coupled in series with said resistor and the emitter of both said pair of transistors being coupled in series with the emitter-collector path of said first transistor.

References Cited

UNITED STATES PATENTS

| | | | |
|---|---|---|---|
| 3,254,238 | 5/1966 | Cooperman | 307—206 |
| 3,316,426 | 4/1967 | Imahashi | 307—224 |
| 3,320,605 | 5/1967 | Reeves | 340—347 |
| 3,333,262 | 7/1967 | Orsen | 340—347 |
| 3,341,839 | 9/1967 | Selber | 340—347 |

MAYNARD R. WILBUR, Primary Examiner

MICHAEL K. WOLENSKY, Assistant Examiner

U.S. Cl. X.R.

307—235